US009307848B2

(12) United States Patent
Bernstein (10) Patent No.: US 9,307,848 B2
(45) Date of Patent: Apr. 12, 2016

(54) PRODUCT DISPLAY SYSTEM

(71) Applicant: David Bernstein, Roswell, GA (US)

(72) Inventor: David Bernstein, Roswell, GA (US)

( * ) Notice: Subject to any disclaimer, the term of this patent is extended or adjusted under 35 U.S.C. 154(b) by 212 days.

(21) Appl. No.: 13/801,069

(22) Filed: Mar. 13, 2013

(65) Prior Publication Data

US 2014/0061402 A1 Mar. 6, 2014

Related U.S. Application Data

(63) Continuation-in-part of application No. 13/596,748, filed on Aug. 28, 2012, now Pat. No. 8,814,108.

(51) Int. Cl.
| | |
|---|---|
| *A47F 5/00* | (2006.01) |
| *A47F 7/00* | (2006.01) |
| *F16M 11/00* | (2006.01) |
| *F16M 13/00* | (2006.01) |
| *A47F 5/04* | (2006.01) |
| *A47B 96/06* | (2006.01) |
| *A47G 29/00* | (2006.01) |
| *A47K 1/00* | (2006.01) |
| *E04G 5/06* | (2006.01) |
| *F21V 21/00* | (2006.01) |
| *F21V 35/00* | (2006.01) |
| *A47F 5/08* | (2006.01) |
| *F16M 11/04* | (2006.01) |

(52) U.S. Cl.
CPC ................ *A47F 5/04* (2013.01); *A47F 5/0006* (2013.01); *A47F 5/08* (2013.01); *A47F 5/0823* (2013.01); *A47F 2005/0012* (2013.01); *F16M 11/041* (2013.01); *Y10T 16/19* (2015.01); *Y10T 16/191* (2015.01)

(58) Field of Classification Search
CPC ... F16M 13/02; F16M 13/022; F16M 11/041; Y10T 16/191; Y10T 16/19; A47F 5/08; A47F 5/0823; A47F 5/04
USPC ............... 248/124.1, 220.21, 220.31, 220.41, 248/220.42, 220.43, 221.12; 52/36.5, 837, 52/690, 481.1, 781; 211/107, 113, 117, 211/190–193, 54.1, 57.1, 59.1, 106.01, 207
See application file for complete search history.

(56) References Cited

U.S. PATENT DOCUMENTS

| | | | | |
|---|---|---|---|---|
| 797,451 | A | | 8/1905 | McBryde |
| 2,872,144 | A | | 2/1959 | Hobson |
| 2,964,348 | A | * | 12/1960 | Ingham ...................... 294/87.28 |
| 3,038,573 | A | * | 6/1962 | Nuernberger ................ 52/483.1 |
| 3,202,292 | A | | 8/1965 | Deliso |
| 3,512,654 | A | | 5/1970 | Olsen et al. |
| 3,749,344 | A | | 7/1973 | Racina |
| 3,844,231 | A | * | 10/1974 | Peacock ........................ 108/107 |
| 3,888,441 | A | | 6/1975 | Rebentisch |
| 4,138,019 | A | | 2/1979 | Smith |

(Continued)

*Primary Examiner* — Jonathan Liu
*Assistant Examiner* — Taylor Morris (57) ABSTRACT

A product display system includes a hanger support member and one or more product hangers. The hanger support member includes a web having opposite first and second sides. The web has a corrugated profile defining a plurality of channels. A plurality of receiving apertures extend through the web from the first side to the second side and define at least one row of receiving apertures extending across the channels. A first product hanger may be mounted to the first side of the web through the row of receiving apertures and a second product hanger may be mounted to the second side of the web through the row of receiving apertures. The hanger support member may be arranged for use with standard pegboard hooks.

17 Claims, 6 Drawing Sheets

(56) References Cited

U.S. PATENT DOCUMENTS

| | | | | |
|---|---|---|---|---|
| 4,607,753 A | * | 8/1986 | Radek | 211/94.01 |
| 4,951,827 A | * | 8/1990 | Moransais | 211/59.1 |
| 5,086,935 A | | 2/1992 | Gallagher | |
| 5,305,898 A | * | 4/1994 | Merl | 211/87.01 |
| 5,433,327 A | * | 7/1995 | Benvenuti et al. | 211/193 |
| 5,502,929 A | * | 4/1996 | Daniels | 52/69 |
| 5,547,088 A | | 8/1996 | Belokin et al. | |
| 5,657,884 A | | 8/1997 | Zilincar, III | |
| 5,664,380 A | * | 9/1997 | Hsueh | 52/126.4 |
| 5,944,203 A | * | 8/1999 | Vlah et al. | 211/189 |
| 5,957,422 A | | 9/1999 | Shea | |
| 6,070,747 A | | 6/2000 | Shea | |
| 6,083,051 A | | 7/2000 | Chang | |
| 6,202,866 B1 | | 3/2001 | Shea | |
| 6,234,436 B1 | * | 5/2001 | Kump | 248/220.21 |
| 6,349,507 B1 | * | 2/2002 | Muellerleile | 52/36.5 |
| D459,626 S | | 7/2002 | Shea | |
| D464,510 S | | 10/2002 | Shea | |
| D465,371 S | | 11/2002 | Shea | |
| 6,484,985 B1 | | 11/2002 | Heltzer | |
| D466,352 S | | 12/2002 | Shea | |
| 6,536,613 B2 | | 3/2003 | Shea | |
| 7,070,021 B1 | | 7/2006 | McKinney | |
| 7,118,000 B2 | | 10/2006 | Shea | |
| 7,121,416 B2 | | 10/2006 | Shea | |
| 7,182,232 B2 | | 2/2007 | Fleming et al. | |
| 7,188,742 B2 | * | 3/2007 | Skulnik | 211/135 |
| 7,331,473 B2 | | 2/2008 | Smith et al. | |
| 7,427,053 B2 | | 9/2008 | Nawrocki | |
| 7,513,374 B2 | | 4/2009 | Smith et al. | |
| 7,571,882 B2 | | 8/2009 | Walter | |
| 7,677,400 B2 | | 3/2010 | Bayazit et al. | |
| 7,690,607 B2 | | 4/2010 | Garmyn | |
| 7,712,616 B2 | | 5/2010 | Barkdoll | |
| 7,748,541 B2 | | 7/2010 | Smith et al. | |
| 7,846,535 B2 | * | 12/2010 | Thiagarajan | 428/181 |
| 8,087,521 B2 | | 1/2012 | Schwartzkopf et al. | |
| 8,127,941 B2 | | 3/2012 | Smith et al. | |
| 2008/0190065 A1 | * | 8/2008 | Craig et al. | 52/586.1 |
| 2010/0127141 A1 | | 5/2010 | Chan et al. | |

* cited by examiner

PRODUCT DISPLAY SYSTEM

CROSS-REFERENCE TO RELATED APPLICATIONS

This application is a continuation-in-part of U.S. patent application Ser. No. 13/596,748, filed Aug. 28, 2012, which is incorporated by reference in its entirety herein.

BACKGROUND

1. Field of the Disclosure

The present disclosure relates generally to a product display system, such as for displaying merchandise at a retail location.

2. Description of the Background

Retail merchandise is displayed in many different ways at a retail outlet. For example, merchandise may be displayed on shelves or in racks. The method of displaying the merchandise is often selected in a manner to enhance some consumer perception, such as value, desirability, etc.

Some methods of displaying merchandise are intended to capitalize on the so called impulse purchase. Such methods generally include displaying a small number of relatively small sized product units in a location that is both immediately noticeable to the consumer and easily accessible. Sometimes these displays are placed in a location where a consumer is likely to have to wait for some period of time, such as at checkout counters. Sometimes such displays are located along the general flow of traffic of consumers through a store and prominently displayed in a manner that literally stands apart from the surrounding products. Such product displays often include a hanging vertical display assembly including an elongate vertical body with multiple product hangers extending from one or both sides of a vertical base strip, also frequently known as strip display assemblies.

Strip display assemblies come in many different forms. One common strip display assembly includes an upstanding or hanging, generally vertical support panel with a number of product hangers, such as hooks or clips, that extend from one side of the vertical panel. Products are hung from the product hangers and a consumer may easily remove one of the products from the strip display assembly by simply lifting it off the hook or removing it from the clip. Often these strip display assemblies are single-sided, meaning that the hooks are disposed on only one side of the support panel. Such single-sided strip display assemblies however may not maximize the available amount of display space because products can only be displayed on one side of the support panel.

In order to overcome the limitations of the single-sided strip display assembly, other strip display assemblies have been adapted to be two-sided, wherein product hangers are disposed on front and back sides of a generally vertical support panel, such that products may be displayed on both the front and back sides of the strip display assembly rather than on only one side of the support panel.

Strip display assemblies often include removable product hangers that may be assembled to hang from the support panel in any of the many different locations to provide a more versatile product display system that is adaptable for displaying products of different sizes and/or in different arrangements. One common type of product display system includes a pair of vertically oriented support panels disposed adjacent each other with a space or gap formed therebetween. Each support panel includes a plurality of apertures therethrough, and each display hanger includes one or more brackets or cleats that can be inserted into various ones of the apertures to releasably mount the product hanger to the support panel. The two support panels are spaced apart so that the distal ends of the brackets of one product hanger do not interfere with the distal ends of the brackets of another product hanger when the two product hangers are mounted on opposite sides of the support panels aligned directly opposite with each other. Some general examples of systems generally similar to this are disclosed in Shea, U.S. Pat. No. 5,957,422 and in Barkdoll, U.S. Pat. No. 7,712,616. Although versatile, this style of strip display assembly often requires some assembly in the field in order to dispose the two support panels in spaced apart relation.

Another type of strip display assembly dispenses with the need to assemble the two support panels in spaced apart relation by providing only a single support panel that is vertically oriented, for example by being hung from a hook. Display hangers are connected to the vertical panel with cleats that extend through apertures through the support panel. Display hangers can be hung on either or both of the front side and the back side of the support panel. Some general examples of systems generally similar to this are disclosed in Shea, U.S. Design Pat. No. D464,510 and Shae U.S. Pat. No. 6,536,613. However, in this arrangement it is not possible to hang two display hangers on both the front and back sides of the vertical panel such that the product hangers are directly opposite or aligned with each other vertically and horizontally. Rather, it is necessary in this type of strip display assembly for one product hanger on one side of the vertical panel to be displaced vertically and/or horizontally from the other product hanger on the other side of the vertical panel so that the cleats of the one product hanger do not interfere with the other product hanger. This effect can limit the versatility of this type of strip display assembly.

SUMMARY

According to some aspects of the present disclosure, a hanger support member is provided that can be used with known product hangers, such as traditional pegboard hooks. Preferably, the hanger support member can be used with the traditional pegboard hooks and with other product hangers according to the present disclosure.

In one exemplary arrangement of the present disclosure, a hanger support member for a supporting one or more product hangers, such as traditional pegboard hooks, has a web defining first and second channels on a first side of the web and third and fourth channels on a second side of the web, wherein the channels extend axially along the web. At least one row of receiving apertures extends laterally across the first through fourth channels, wherein each aperture in the row extends through the web. The web preferably has a corrugated cross section extending between opposite lateral edges of the web and defining the first through fourth channels. The first and second channels are preferably alternatingly interspersed with the third and fourth channels.

In another aspect of the present disclosure, a product display system includes the hanger support member and one or more product hangers adapted to be mounted to the hanger support member with one or more brackets that fit through the receiving apertures. The product hangers and the hanger support member are arranged such that two product hangers may be mounted on opposite sides of the hanger support member in the same row of receiving apertures so as to be aligned with each other horizontally and vertically without requiring two vertical support panels with a space therebetween. Rather, when a product hanger is mounted to either side of the hanger support member, a space is formed by one or more of the channels between the hanger support member and the product hanger. The space is sized or arranged to receive a distal end of the mounting brackets from the other product hanger mounted on the other side of the hanger support member directly opposite the one product hanger. When the product hanger is mounted to one side of the web, one or more brackets extend through corresponding receiving apertures in the row of apertures and into the channels on the opposite side of the web, which are sized to receive the distal ends of the brackets from the product hanger mounted on the opposite side of the hanger support member, preferably without extending beyond the surface of the opposite side of the web.

In further accordance with any one or more of the foregoing exemplary aspects and/or arrangements, a product display system and/or any one more component thereof optionally may include any one or more of the following optional forms.

In some optional forms, the first row of receiving apertures includes a first receiving aperture disposed in the first channel, a second receiving aperture disposed in the second channel, a third receiving aperture disposed in the third channel, and a fourth receiving aperture disposed in the fourth channel. Preferably, a second row of receiving apertures extends laterally across the first through fourth channels, each aperture of the second row extending through the web from the first side to the second side. The second row may be spaced axially from the first row.

In some optional forms, a flattened portion is disposed at the first end of the web. The flattened portion may extend laterally across a portion of each of the second channel and the third channel. An aperture may extend through the flattened portion from the first side to the second side for hanging the hanger support, for example from hanger such as a hook, nail, or chain.

In some optional forms, the hanger support member includes a first flange disposed along a first lateral edge of the web and, preferably, a second flange disposed along a second lateral edge of the web. The flanges may be spaced apart laterally a distance sufficient to receive a product hanger therebetween on the first side with a first bracket of the product hanger disposed through the third receiving aperture and a second bracket of the product hanger disposed through the fourth receiving aperture. The distal ends of each of the first and second flanges may extend past a respective first or second side of the web.

In some optional forms, each receiving aperture has a circular shape or a keyhole shape including a circular portion and a slot extending from the circular portion. The circular portion may be an elongated circular shape or an oval shape.

In some optional forms, a bracket on a product hanger is arranged to be received through a first receiving aperture in a row of apertures when mounted to the first side of the hanger support member and to be received through a different, second receiving aperture in the row of apertures when mounted to the second side of the hanger support member.

In some optional forms, the product hanger includes a body having an outboard side opposite an inboard side, one or more brackets extending from the inboard side, and optionally a product support member disposed on the outboard side. The brackets are preferably arranged to be mounted in a first respective one or two of the receiving apertures in the row of apertures when mounted to the first side of the web, and the brackets are arranged to be mounted in a second one or two of the receiving apertures in the row of apertures when mounted to the second side of the web.

In one arrangement, a first product hanger and a second product hanger are removably mounted on opposite sides of the web at the same time in the same row of receiving apertures. The first product hanger is mounted on the first side of the web with its first mounting bracket disposed through the fourth receiving aperture and its second mounting bracket disposed through the third receiving aperture. The second product hanger is removably mounted on the second side of the web with its first mounting bracket disposed through the second receiving aperture and its second mounting bracket disposed through the first receiving aperture.

Other aspects and forms will become apparent upon consideration of the following detailed description.

DETAILED DESCRIPTION

Figures 1, 1A:
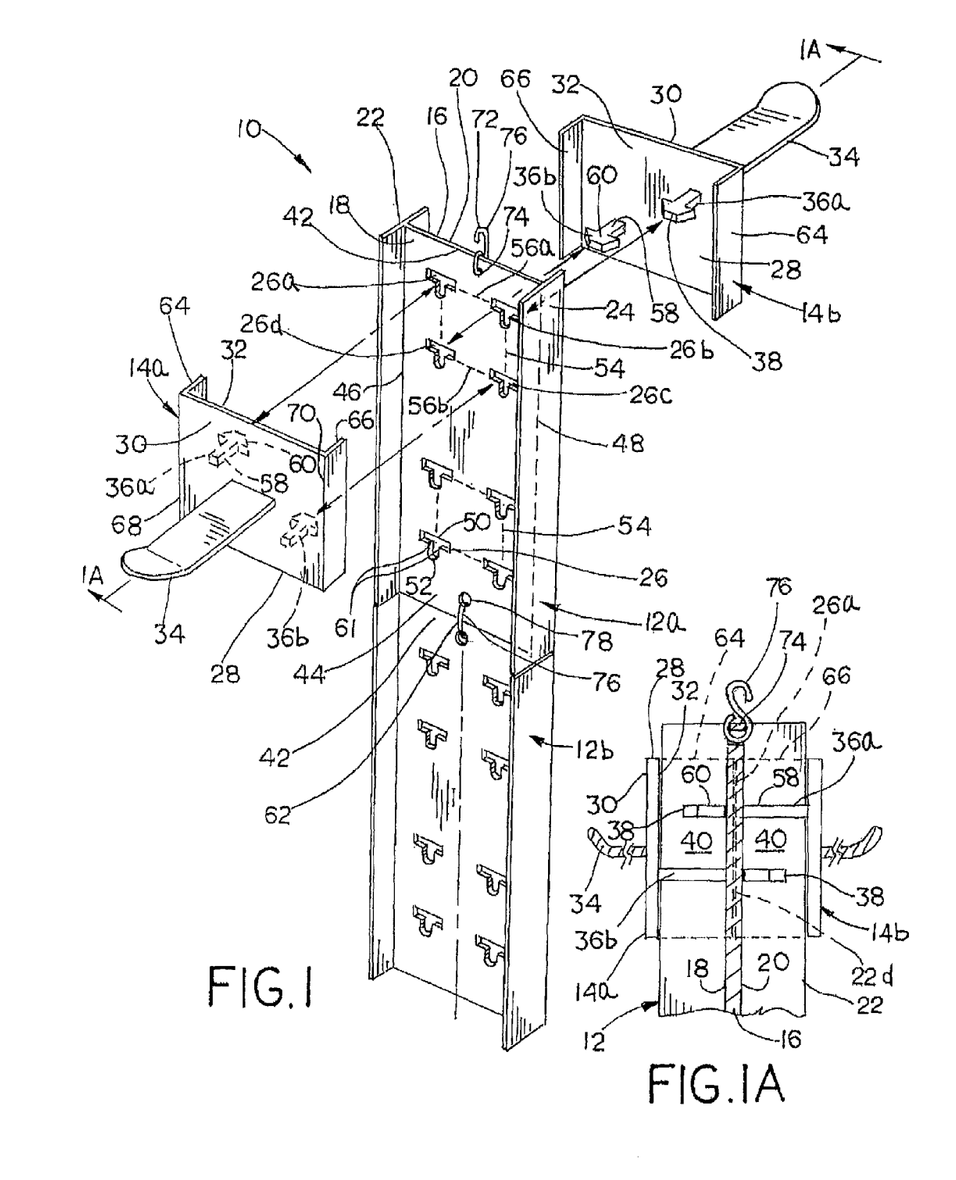
FIG. 1 is an exploded isometric view of one exemplary arrangement of a product display assembly in accordance with the present disclosure.
FIG. 1A is a vertical horizontal cross-sectional view of the product display assembly taken along the line 1A-1A of FIG. 1.

Turning now to the drawings, FIGS. 1 and 1A show an exemplary product display system 10 including one or more hanger support members 12, such as a first and second or upper and lower hanger support members 12a and 12b, and one or more product hangers 14, such as first and second product hangers 14a and 14b, arranged to be removably mounted to either or both of the hanger support members 12a and 12b. Preferably, the hanger support members 12a, 12b are substantially identical, and the product hangers 14a, 14b are substantially identical, and the letter designation "a," "b," etc. identify different units of the same basic component. Each hanger support member 12 includes a web 16 that is generally vertically oriented having opposite first and second sides 18, 20, a first spacer flange 22, a second spacer flange 24, and a plurality of receiving apertures 26, of which only four receiving apertures 26a-26d are specifically called out by individual references a-d for clarity sake. Each product hanger 14 includes a body 28 having an outboard side 30 opposite an inboard side 32, a product support member 34 extending outwardly from the outboard side 30, and one or more brackets 36, such as first and second brackets 36a, 36b, extending outwardly from the inboard side 32 and arranged to be mounted in a diagonally offset pair of the receiving apertures 26. Preferably, the brackets 36 and the receiving apertures 26 are arranged such that the product hangers 14 may be releasably mounted to the hanger support member 12 to allow easy removal and re-arrangement when desired. The brackets 36a, 36b and the receiving apertures 26a-d are arranged such that the first product hanger 14a may be releasably mounted to the first side 18 of the web 16 with its brackets 36a, 36b disposed through a first set 26a, 26c of the receiving apertures 26, and the second product hanger 14b may be releasably mounted to the second side 20 of the web 16 aligned directly opposite the first product hanger 14a with its brackets 36a, 36b disposed through a second set 26b, 26d of the receiving apertures 26. So configured, and as shown in FIG. 1A, a distal end 38 of each bracket 36 is disposed in a space 40 between the web 16 and the body 28 of the opposite product hanger 14.

Turning again to the hanger support member 12, the web 16 has a top end 42, a bottom end 44, and left lateral and right lateral edges 46, 48 extending between the top end 42 and the bottom end 44. Each spacer flange 22, 24 forms a spacer on the first side 18 and a spacer on the second side 20. Each spacer flange 22, 24 projects in a first direction away from the first side 18 and projects in a second direction opposite the first direction extending away from the second side 20. The first spacer flange 22 is disposed along the left lateral edge 46. The second spacer flange 24 is disposed along the right lateral edge 48. Each spacer flange 22, 24 extends vertically along the respective lateral edges 46, 48. Each spacer flange 22, 24 extends from the top end 42 to the bottom end 44. The spacer flanges 22, 24 are parallel with each other and perpendicular to the web 16. The web 16 and the spacer flanges 22, 24 form an I-section extending from the top end 42 to the bottom end 44, thereby defining a recess or cavity that forms the space 40 on each of the first and second sides 18, 20 of the web 16. Said another way, the web 16 and the spacer flanges 22, 24 have an I-beam type construction with a cross-section that is shaped like the letter "I".

Each receiving aperture 26 extends completely through the web 16 from the first side 18 to the second side 20, preferably forming a tubular opening through the web 16. Each receiving aperture 26 has an upper section 50 and a lower section 52. The upper section 50 has a first horizontal width, and the lower section 52 has a second horizontal width that is less than the first horizontal width. The upper section 50 is in the form of a horizontal slot. The lower section 52 is in the form of a vertical slot extending downwardly from the upper section 50. Together, the upper section 50 and lower section 52 form a generally T-shaped opening through the web 16.

The receiving apertures 26 are arranged in a plurality of quadrilateral arrays, as shown by the dashed line 54 in FIG. 1, spaced apart vertically along the web 16. Each quadrilateral array 54 is defined by four spaced part receiving apertures, such as the receiving apertures 26a-26d, arranged in a rectangular pattern, such as a square, having one receiving aperture 26 located at each corner of the rectangle. A top pair of the receiving apertures, such as the receiving apertures 26a and 26b, defines a first horizontal row 56, such as upper row 56a, and a lower pair of the receiving apertures, such as the receiving apertures 26c and 26d, defines a second horizontal row 56, such as lower row 56b. Although the depicted embodiment shows the quadrilateral array 54 as a rectangular array, the quadrilateral array 54 may alternatively take other shapes, including a trapezoidal shape, for example, with the receiving apertures 26a, 26b being horizontally spaced apart wider than the receiving apertures 26c, 26d. Preferably, the quadrilateral array 54 is symmetrical about some vertical line, such as the longitudinal axis of the hanger support member 12. The upper row 56a is vertically spaced from the lower row 56b a first distance or height, and each quadrilateral array 54 is spaced vertically from an adjacent quadrilateral array 54 a second distance. The second distance between adjacent quadrilateral arrays 54 may be the same as or different than the height of each quadrilateral array 54. In the exemplary arrangement, the hanger support member 12 is shown with two quadrilateral arrays 54 thereby defining four vertically spaced apart horizontal rows 56; however, additional rows 56 and/or arrays 54 may be provided and/or the length of the hanger support member 12 between the top end 42 and the bottom end 44 may be increased.

Turning again to the product hanger 14, the body 28 is in the form of a plate, which is preferably flat on each of the outboard and inboard sides 30, 32. The product support member 34 in this exemplary arrangement is in the form of a hook having a first end connected to the outboard side 32 and an upturned distal end spaced from the outboard side 32. However, the product support member 34 may take other forms, such as a cleat, bracket, or other support structures (not shown) arranged to support one or more pieces of merchandise. The product support member 34 may include or be in the form of a clip. In any arrangement, the product support member 34 is arranged to support one or more units of merchandise, such as packets, bags, clusters, individual items, or other units of merchandise.

Each bracket 36 includes a shaft 58 and a head 60. The shaft 58 has a first end connected to the inboard side 32 of the body 28 and extends out from the inboard side 32 toward the distal end 38. The head 60 is wider than the shaft 58 in the horizontal direction. That is, the shaft 58 has a first horizontal width, and the head 60 has a second horizontal width that is wider than the first horizontal width. The shaft 58 and the head 60 form a flat horizontal plate, wherein each of the shaft 58 and the head 60 has a horizontally aligned, planer shape that is arranged to fit into the horizontal slot of the upper section 50 in each receiving aperture 26. The head 60 is sized to fit through the upper section 50 but not through the lower section 52. Thus the horizontal width of the head 56 is approximately equal to or slightly less than the horizontal width of the upper section 50 and wider than the horizontal width of the lower section 52. The shaft 58 is sized also to fit into the lower section 52. The head 60 is disposed at the distal end 38 of the bracket 36. The head 60 is spaced apart from the inboard side 32 of the body 28 a distance equal to at least the sum of the width of the space 40 and the width of the web 16. In this arrangement, the head 60 of each bracket 36 can first slide into and through the upper section 50 of a corresponding aperture 26 from one side of the web 16. Then, the shaft 58 can slide downwardly into the lower section 52, such that the head 60 engages the other side of the web 16 and prevents the product hanger 14 from disengaging from the web 16 while the shaft 58 is disposed through the lower section 52.

Preferably, an upper end of the lower section 52 has a constricted neck, for example formed by a pair of opposing projections 61 disposed on opposite sides of the lower section 52, that is narrower than the remaining portions of the lower section 52. The projections 61 are spaced apart a width sufficient to form an interference fit with the shaft and to allow the shaft 58 to resiliently slide through the constricted neck, thereby forming a snap-fit locking arrangement for the shaft 52 to prevent the neck 58 from accidentally slipping out of the lower section 52. Optionally, the shaft 58 may have a tapered cross-section along the side edges rather than a rectangular cross-section to help guide the shaft into the constricted neck from the upper section 50 and to help the shaft 58 resiliently snap past the projections 61.

In the exemplary arrangement depicted in FIGS. 1 and 1A, the brackets 36*a* and 36*b* are spaced apart diagonally on the body 24 of each product hanger 14. The bracket 36*a* is vertically displaced or offset above the bracket 36*b*, and each of the brackets 36*a* and 36*b* are horizontally spaced apart, preferably symmetrically, on opposite sides of a vertical center line of the inboard side 32 of the product hanger 14. The brackets 36*a* and 36*b* are arranged to engage opposite diagonal receiving apertures 26*a*, 26*c* or 26*b*, 26*d* in any one of the quadrilateral arrays 54. Thus, as illustrated in FIG. 1 relative to the product hanger 14*a*, bracket 36*a* is arranged to fit into the upper left receiving aperture 26*a* and bracket 36*b* is arranged to fit into the lower right receiving aperture 26*c* in any one of the quadrilateral arrays 54 when mounted on or from the first side 18 of the web 16. Similarly, when the product hanger 14*b* is mounted on the second side 20 of the web 16, the brackets 36*a* and 36*b* fit into the opposite diagonal receiving apertures 28*b* and 28*d*, respectively, of any one of the quadrilateral arrays 54.

Optionally, some or all of the rows 56 on a web 16 are spaced apart the same height, whereby the height of each quadrilateral array 54 is equal to the distance between each adjacent pair of quadrilateral arrays. In this arrangement, the brackets 36*a*, 36*b* of any one product hanger 14 may also fit into diagonally adjacent receiving apertures in two adjacent quadrilateral arrays 54.

To releasably mount the product hanger 14 onto the hanger support member 12, the brackets 36*a* and 36*b* are inserted into respective opposite diagonal receiving apertures, such as receiving apertures 26*a*, 26*c* if mounted on the first side 18 of the web 16 or receiving apertures 26*b*, 26*d* if mounted on the second side 20 of the web 16. The inboard side 32 of the body 28 engages distal ends of the spacer flanges 22, 24, thereby forming the space 40 in the form of a gap between the inboard side 32 and the web 16. The space 40 is sized to receive the head 60 of each bracket 36 completely therein. Thus, as best seen in FIG. 1A, a first product hanger 14 can be mounted onto the first side 18 of the web 16 and a second product hanger 14 can be mounted onto the second side 20 of the web 16 directly opposite the first product hanger 14 both horizontally and vertically aligned therewith. In this arrangement, the head 60 of each bracket 36 mounted on one side of the web 16 is disposed in the space 40 on the other side of the web 16 formed between the web 16 and the body 28 of the opposite product hanger 14 on the other side of the web 16. Thus in this arrangement, two product hangers 14 can be attached directly opposite each other in vertical and horizontal alignment on opposite sides of the web 16, without requiring a second web with a space between two webs as in the prior art.

The lower hanger support member 12*b* may be hung below the upper hanger support member 12*a* to extend the vertical length of the product display system 10. The top end 42 of the lower hanger support member 12*b* may be attached to the bottom end 44 of the upper hanger support member 12*a* by any sufficient mechanism, such as a hook or clip 62. In one exemplary arrangement, the lower hanger support member 12*b* can be hung from the upper hanger support member 12*a* by one or two product hangers 14*a* and/or 14*b*. For example, the upper bracket 36*a* of the product hanger 14*a* can be inserted into a lower or bottom receiving aperture 26 at the bottom end 44 of the upper hanger support member 12*a*, and the lower bracket 36*b* is inserted into a diagonally opposite upper or a top receiving aperture 26 at the top end 42 of the lower hanger support member 12*b*. Optionally, the second product hanger 14*b* may be mounted onto the opposite sides of the webs 16 of the upper and lower hanger support members 12*a*, 12*b* in a similar manner with the brackets 36*a*, 36*b* mounted through the opposite diagonal receiving apertures 26 at the bottom end 44 and top end 42 of the upper and lower hanger support members 12*a*, 12*b*, respectively.

Each product hanger 14 optionally includes a pair of guide flanges 64, 66 disposed along opposite lateral edges 68, 70, respectively, of the body 28. Each guide flange 64, 66 preferably extends from a top end of the body 28 to a bottom end of the body 28 along the respective lateral edge 68, 70. However, the guide flanges 64, 66 may take other forms consistent with the functionality described herein. The guide flanges 64, 66 are spaced apart laterally sufficient to engage the spacer flanges 30, 32, such as to be disposed along the outer surfaces of the spacer flanges 22, 24 when the brackets 36*a*, 36*b* are inserted into receiving apertures 26 as described previously herein. Preferably an inner surface of each guide flange 64, 66 slidably engages an opposing outer surface of the respective spacer flange 22, 24. In this manner the guide flanges 64, 66 may help to guide the brackets 36*a*, 36*b* into the appropriate receiving apertures 26. The guide flanges 64, 66 may provide additional lateral stability for the product hangers 14, for example, to prevent twisting of the product hangers 14 when hung on the hanger support member 12.

In some arrangements, the guide flanges 64, 66 may be offset inwardly between the spacer flanges 22, 24 rather than being spaced outwardly from the spacer flanges 22, 24. In such an arrangement, the guide flanges 64, 66 may also or alternatively serve as spacers to maintain the space 40 between the body 28 and the web 16 sufficient to receive the heads 60 of the brackets 36, as described previously.

The guide flanges 64, 66 are sized and/or arranged such that two product hangers 14 may be mounted directly opposite each other on opposite sides 18, 20 of the web 16, and the distal ends of the guide flanges 64, 66 on the opposing product hangers 14 will either fit tightly against each other or will be slightly spaced apart so as to not interfere or prevent the product hangers 14 from being secured to the web 16 as previously described. Each guide flange 64, 66 is not longer than approximately half the length of the spacer flanges 22, 24 and/or the depth of the distal end of the spacer flanges 22, 24 to the center of the web 16.

As shown in FIG. 1, a hanging assembly 72 is optionally disposed at or near the top end 22 of the web 16. The hanging assembly 72 includes one or both of a hanger receiver 74, such as an aperture extending through the web 16, and a hanger 76, such as a hook as exemplified in the drawings. Other forms of hanging assemblies 72 may be used that would be sufficient to hang the hanger support member 12 from some support member, such as a rod or bracket. A second aperture 78 may be disposed near the bottom end 44 of the web 16 and arranged to receive, for example, another hanger 76, such as a hook, carried as part of a hanging assembly 72 in the lower support member 12*b*.

Figures 2, 2A:
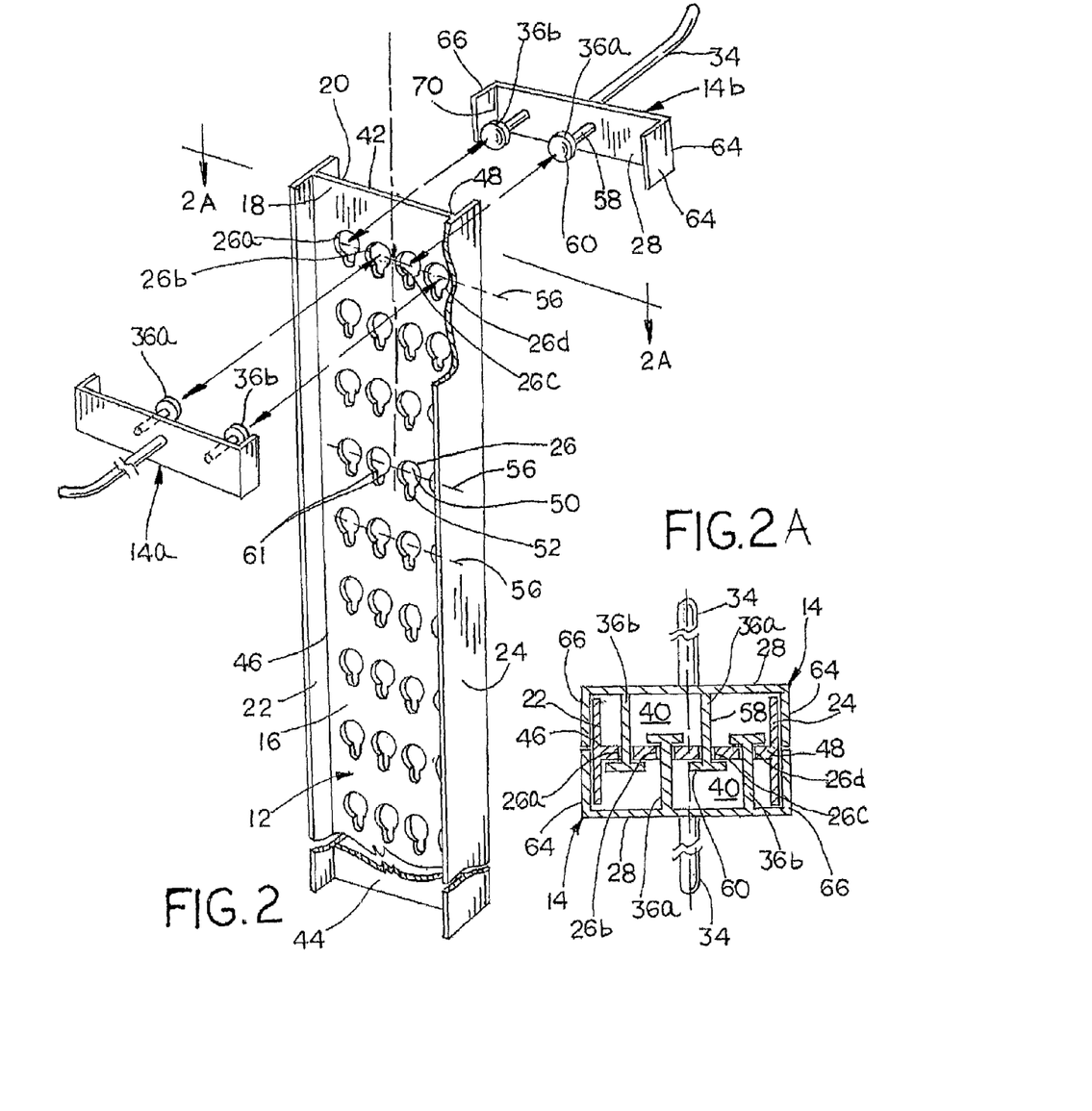
FIG. 2 is an exploded isometric view of another exemplary arrangement of a product display system according to the present disclosure.
FIG. 2A is a horizontal cross-sectional view of the product display assembly taken along the line 2A-2A of FIG. 2.

FIGS. 2 and 2A show another example arrangement of the product display system 10, which is similar to the example product display system shown in FIGS. 1 and 1A Like the previous example, the product display system 10 includes a hanger support member 12 and one or more product hangers 14, such as product hangers 14*a* and 14*b*, that can be releasably mounted on opposite sides 18, 20 of the web 16. The hanger support member 12 includes a vertically oriented web 16 extending between a top end 42 and a bottom end 44, a plurality of receiving apertures 26 extending through the web 16, and spacer flanges 22, 24 disposed along opposite lateral left and right side edges 46, 48 of the web 16. Each product hanger 14 includes a body 28 in the form of a flat plate, a product support member 34 in the form of a hook extending from an outboard side 30 of the body 28, and a pair of brackets 36a, 36b extending from an inboard side 32 of the body 28. Each product hanger 14 also includes a pair of guide flanges 64, 66 disposed along opposite lateral edges 68, 70 of the body 28 and extending in the same direction as the brackets 36. The product hanger 14 can be releasably mounted onto either or both of the first and second sides 18, 20 of the web by inserting the brackets 36a, 36b into corresponding ones of the receiving apertures 26. Further, two product hangers 14 can be releasably mounted simultaneously aligned directly opposite each other on opposite sides 18 and 20.

Unlike the product display system in FIGS. 1 and 1A, however, the receiving apertures 26 are arranged in a plurality of vertically spaced apart linear arrays, such as horizontal rows 56, wherein each row 56 includes four horizontal spaced apart receiving apertures 26a, 26b, 26c, 26d. Preferably, the receiving apertures 26a-d in each row 56 are spaced apart evenly and horizontally symmetric about a vertical centerline along the axis of the web 16, with first and second apertures 26a and 26b on the left side of the vertical center line and third and fourth apertures 26c and 26d disposed on the right side of the vertical center line as seen in FIG. 2. Each row 56 of apertures 34a-d may be vertically spaced from the adjacent rows 56 a distance equal to the horizontal distance between opposite ends of the row 56 or a different spacing.

Also different, the brackets 36a, 36b on each product hanger 14 are aligned horizontally and offset asymmetrically left or right between the guide flanges 64, 66 from a vertical center line of the body 28. The brackets 36a and 36b are arranged on the product hanger 14 to fit into and through the receiving apertures 26b and 26d, respectively, if mounted onto the first side 18 of the web, and to fit into and through receiving apertures 26c and 26a, respectively, if mounted onto the second side 20 of the web 16 as best seen in FIG. 2A. As with the exemplary arrangement of FIGS. 1 and 1A, each receiving aperture 26 has an upper section 50 and a lower section 52, wherein the upper section 50 is wider than the lower section 52. In exemplary arrangement of FIGS. 2 and 2A, each receiving aperture 26 has the shape generally of a key hole, wherein the upper section 50 has a generally circular shape with a first diameter and the lower section 52 is in the form of a vertically oriented slot extending downwardly from the upper section 50 with a width that is less than the diameter of the upper section 50. Preferably, an upper end of the lower section 52 has a constricted neck, for example formed by a pair of opposing projections 61 disposed on opposite sides of the lower section 52, that is narrower than the remaining portions of the lower section 52. The projections 61 are spaced apart a width sufficient to form an interference fit with the shaft 58 and to allow the shaft 58 to resiliently slide through the constricted neck, thereby forming a snap-fit locking arrangement for the shaft 52 to prevent the neck 58 from accidentally slipping out of the lower section 52. Thus, the head 60 of each bracket 36 can fit through the upper section 50 but not through the lower section 52, while the shaft 58 can slide down into the lower section 52 with a snap-fit locking action past the projections 61. Preferably, the head 60 is generally circular shaped having a diameter complementary to the shape just slightly less than the diameter of the upper section 50, and the shaft 58 has a generally cylindrical shape with a diameter just slightly less than the width of the lower section 38 and slightly larger than the space between the opposing projections 61.

In this arrangement, unlike the previous example arrangement, two product hangers 14 may be simultaneously mounted in alignment to the opposite sides 18, 20 of the web 16, and the brackets 36a,b of one product hanger 14 fit into receiving apertures 26a, 26c of a row 56 while the brackets 36a,b of the other product hanger 14 fit into receiving apertures 26b, 26d of the same row 56, as best seen in FIG. 2A.

The remaining portions of the example product display system 10 shown in FIGS. 2 and 2A are substantially similar in form and function as described with regard to the arrangement shown in FIGS. 1 and 1A. The reader is therefore referred to the detailed description of the same features provided previously herein.

Figure 3:
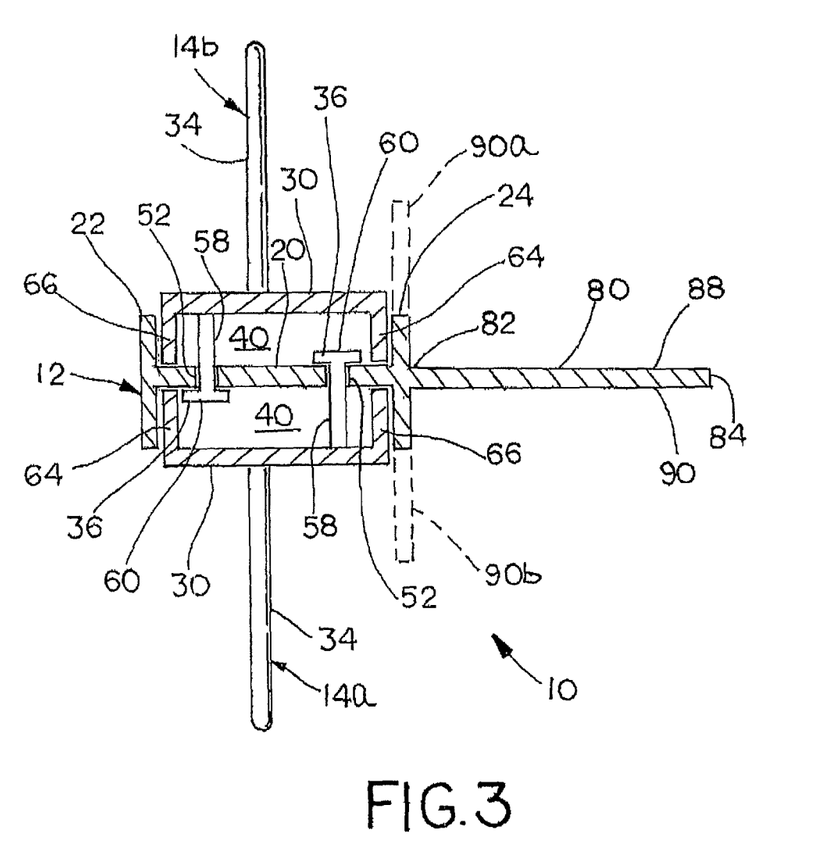
FIG. 3 is a horizontal cross-sectional view similar to FIG. 1A of another exemplary arrangement of a product display assembly according to the present disclosure.

FIG. 3 shows another exemplary arrangement of the product display system 10, wherein the guide flanges 64 and 66 on each product hanger 14 are spaced apart a distance less than the distance between the spacer flanges 22 and 24. As a result, the guide flanges 64 and 66 are disposed between the spacer flanges 22 and 24 when the product hanger 14 is mounted to the hanger support member 12. Optionally, the guide flanges 64, 66 are aligned inwardly from the spacer flanges 22, 24 and arranged to slidingly engage the inner surfaces of the spacer flanges 22, 24. In this arrangement, the guide flanges 64, 66 also function as the spacers that maintain the space 40 between the body 30 of the product hanger and the web 20 of the hanger support member 12 for receiving the heads 60 of the brackets 36.

FIG. 3 shows another optional feature for the display system 10, including one or more graphics support surfaces, such as a graphics support flange 80 extending laterally outwardly from the hanger support member 12. The graphics support flange 80 has a first end 82 connected to the exterior side of the spacer flange 24 opposite the web 20, a second, distal end 86 spaced away from the spacer flange 24, and opposite first and second sides 88, 90. The flange 80 is preferably axially aligned with the web 20. Graphics, such as printing, stickers, and/or laminates with words and/or pictures, may be carried on at least the first and/or second sides 88, 90. In some arrangements, the graphics support flange 80 has a length between the first and second ends 82, 84 of between approximately one inch (2.5 cm) and twelve inches (30 cm), although other lengths may be used depending on the anticipated use, size, and/or scale of the product display system 10 and/or graphics. Another optional graphics support surface includes one or more extensions 90 of the spacer flanges 22 and/or 24, of which only exemplary extensions 90a and 90b on spacer flange 24 are shown. Each extension 90 preferably extends beyond the body 30 when a product hanger 14 is mounted to the same side of the web 20, for example, a distance of one to twelve inches (2.5 cm-30 cm). The extensions 90a, 90b are preferably aligned with and extensions of the opposite distal ends of the flange 24. The extensions 90a, 90b may extend the entire length of the flange 24 from the top end 42 to the bottom end 44 or may be less than the entire length or be intermittent along the length of the flange 24. Like the flange 80, graphics may be carried by at least either or both sides of the extensions 90a, 90b.

Remaining numbered features of the exemplary product display system 10 shown in FIG. 3 are substantially the same in form and function as the same numbered features in the exemplary embodiments of FIGS. 1 and/or 2. The reader is therefore referred to the detailed description of the same features provided previously herein.

Figure 4:
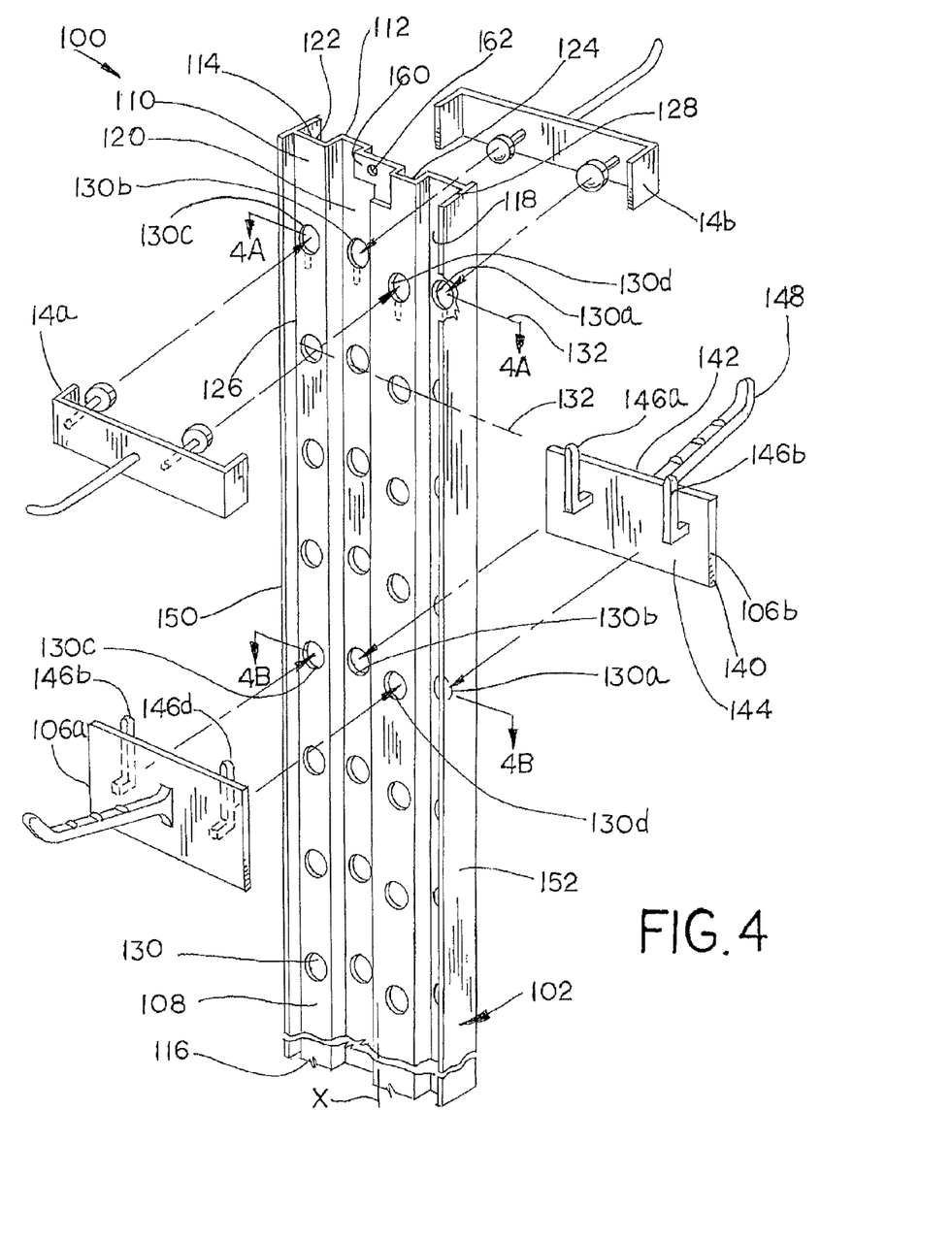
FIG. 4 is an exploded isometric view of another exemplary arrangement of a product display assembly including a hanger support member and two pairs of product hangers in accordance with the present disclosure.
Figure 5:
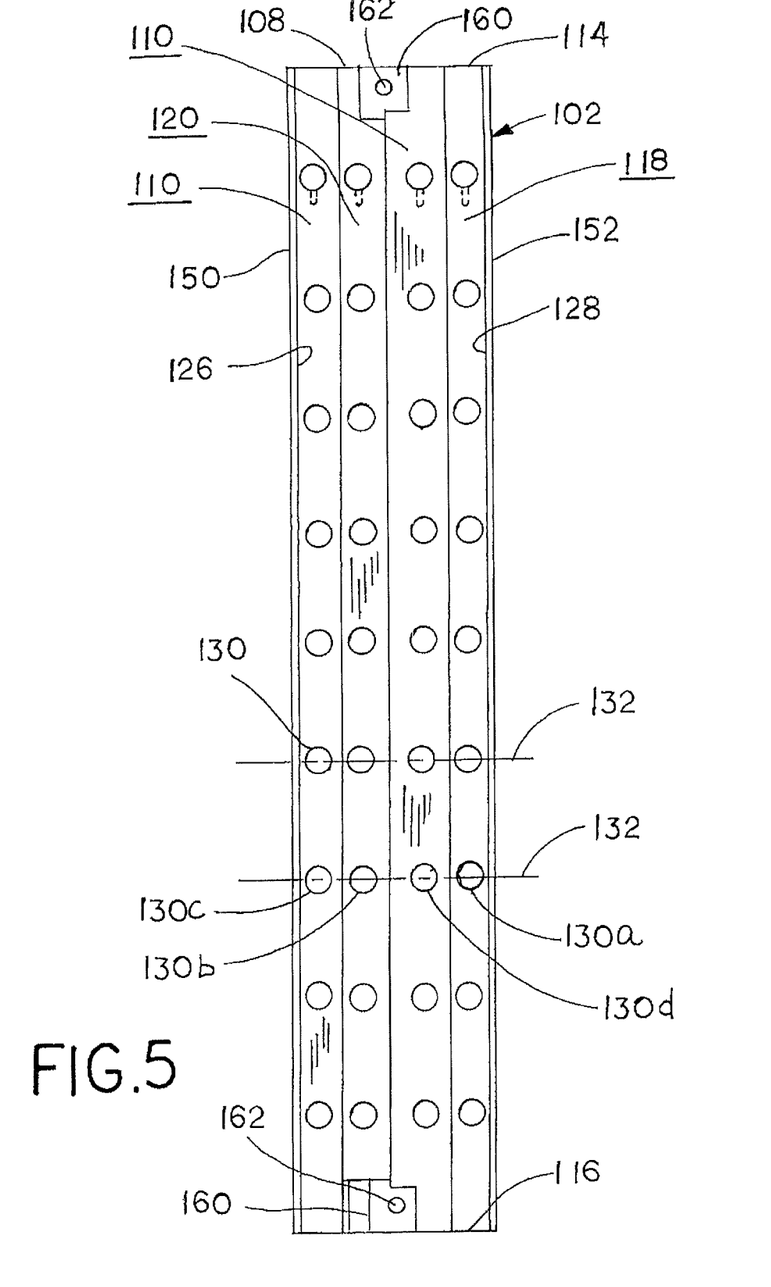
FIG. 5 is a front elevational view of the hanger support member of FIG. 4, the rear elevational view being substantially identical thereto.

Turning now to FIGS. 4 to 5B, another exemplary product display system 100 is shown in accordance with the teachings of the present disclosure. The product display system 100 includes a hanger support member 102 and one or more product hangers such, as product hangers 14a, 14b, and product hangers 106a, and 106b, adapted to be mounted onto the hanger support member 102. As described in more detail hereafter, the product support member 102 is particularly well suited for use with product hangers according to the teaching of the present disclosure and/or with product hangers already known in the art, such as traditional plastic pegboard hooks and traditional wire pegboard hooks.

The hanger support member 102 includes a web 108 having opposite first and second sides 110, 112 extending along an axis X from a first end 114 to a second end 116. First and second channels 118, 120 are recessed into the first side 110. Third and fourth channels 122, 124 are recessed into the second side 112. Each of the first through fourth channels 118, 120, 122, 124 extends along the axis of the web 108 from the first end 114 to the second end 116. Preferably, the web 108 has a corrugated or lateral profile defining the first through fourth channels 118-124. Also preferably, the corrugated profile has a constant thickness between the first and second sides 110, 112 extending from a first lateral edge of the web 126 to a second lateral edge 128 of the web. In some arrangements, the corrugated profile extends from the first end 114 to the second end 116 of the web 108. In other arrangements, the corrugated profile is interrupted between the first and second ends 114, 116 of the web 108. Each of the first through fourth channels 118-124 is parallel with the axis of the web. The first and second channels 118 and 120 are alternatingly interspersed with the third and fourth channels 122 and 124, whereby the first channel 118 is adjacent or proximate the second lateral edge 128 of the web 108, the third channel 122 is disposed adjacent or proximate the first lateral edge 126, the second channel 120 is disposed between the third channel 122 and the fourth channel 124, and the fourth channel 124 is disposed between the first channel 118 and the second channel 120. Said another way, the first and second channels 118, 120 are interleaved or interlaced with the third and fourth channels 122, 124. One or both of the side walls of each channel also form a sidewall of one or both adjacent channels. Although the exemplary hanger support member 102 includes four channels 118-124, additional or fewer channels may be used in other arrangements.

One or more receiving apertures 130 extend through the web 108 from the first side 110 to the second side 112. The receiving apertures 130 are arranged in at least one and preferably a plurality of rows 132 extending laterally across the web 108 and across each of the first through fourth channels 118-124. Each row 132 includes a first receiving aperture 130*a* disposed in the first channel 118, a second receiving aperture 130*b* disposed in the second channel 120, a third receiving aperture 130*c* disposed in the third channel 122, and a fourth receiving aperture 130*d* disposed in the fourth channel 124. Any number of rows 132 of receiving apertures 130 may be disposed along the axis of the web 108. Each row 132 is spaced axially from adjacent rows 132 along the web 108.

The product hangers 14*a*, 14*b* are similar to those described previously herein with reference to FIGS. 2, 2A, and 3. The product hangers 106*a*, 106*b* are in the form of traditional plastic pegboard hooks. Each product hanger 106*a*, 106*b* includes a body 140 having an outboard side 142, an inboard side 144, two mounting brackets, such as the brackets 146*a*, 146*b* in the form of upturned hooks, disposed on the inboard side 144, and a product support member 148, such as a hook or clip, disposed on the outboard side 142 of the body 140. Each product hanger 106*a* and 106*b* can be mounted on either of the first or second sides 110, 112 of the web 108 at any one of the given rows 132 of receiving apertures 130. For example, in any given row 132, the product hanger 106*a* may be mounted to the first side 110 of the web 108 by placing the bracket 146*a* through the fourth receiving aperture 130*d* and placing the bracket 146*b* through the third receiving aperture 130*c*. In this position, as shown in FIG. 4B, the distal ends of the brackets 146*a*, 146*b* are disposed within the channels 122 and 124, respectively, on the opposite, second side 112, of the web 108. Similarly, the product support member 106*b* may be simultaneously mounted to the second side 112 of the web 108 in the same row 132 of receiving apertures 130 by inserting the bracket 146*a* into the second receiving aperture 130*b* and inserting the bracket 146*b* into the first receiving aperture 130*a* with the distal ends of the brackets 146*a* and 146*b* received within the channels 118 and 120, respectively, on the first side 110 of the web 108. As can best seen in FIGS. 4A and 4B, when a product hanger 14*a*, 14*b*, 106*a*, 106*b* is mounted on one side of the web 108, the distal ends of the brackets 36*a*, 36*b*, 146*a*, 146*b* are disposed in spaces formed by the respective channels 120, 124 between the web 108 and the body 28 or 140 of a product hanger 14*a*, 14*b*, 106*a*, 106*b* mounted on the opposite side of the web 108. Thus, two product hangers, such as 106*a* and 106*b* or 14*a* and 14*b*, may be mounted to opposite sides of the web 108 axially and laterally aligned with each other in a single row 132 of apertures 130.

A first flange 150 is disposed along the first lateral edge 126 of the web 108. A second flange 152 is disposed along the second lateral edge 128 of the web 108. Each flange 150, 152 extends the entire axial length of the web 108 from the first end 114 to the second end 116. The flanges 150, 152 may function to provide both stiffness to the web 108 so as to minimize unwanted flexing of the web, and/or to act as spacers as described previously with respect to the hanger support member 12. The flanges 150, 152 are spaced apart laterally a distance sufficient to allow each of the product hangers 106*a*, 106*b* to be mounted onto the web 108 between the flanges 150, 152 as best seen in FIG. 4B. Thus, the web 108 has a width from the first lateral edge 126 to the second lateral edge 128 that is as large as or larger than the width of the body 140. In this manner, the product hanger 106*a* or 106*b* may be mounted flat onto either of the sides 110, 112 of the web 108 between the webs 150 and 152. In other arrangements, one or both of the flanges 150 and 152 may be omitted and/or sized differently.

Figure 4A:
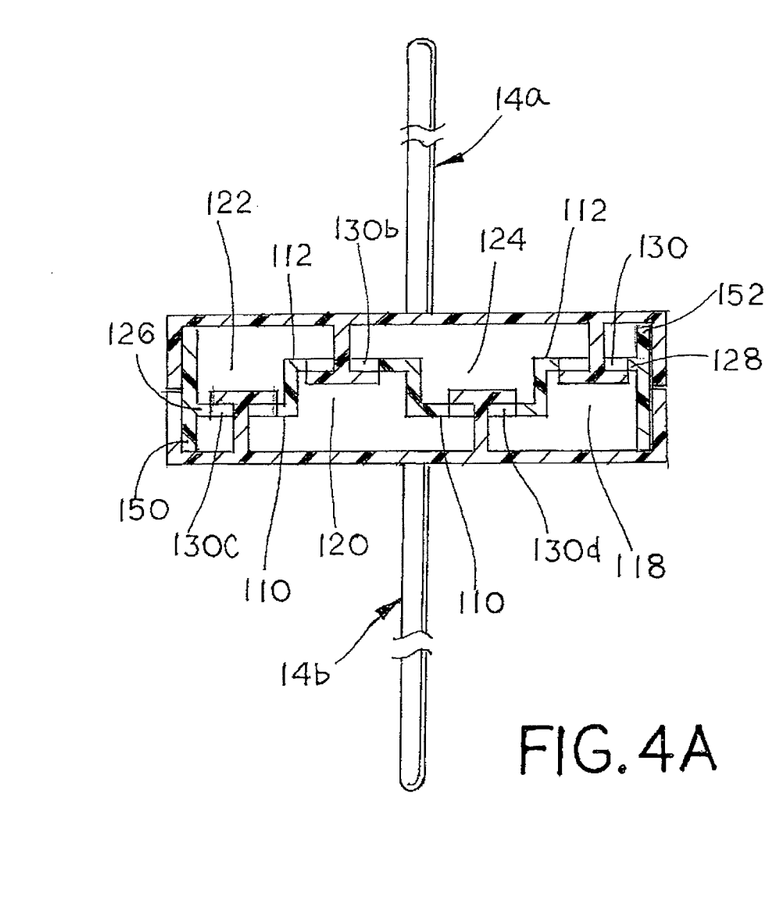
FIG. 4A is a partial horizontal cross-sectional view of the product display assembly of FIG. 4 taken along the line 4A-4A showing one version of product hangers releasably mounted to the hanger support member.
Figure 4B:
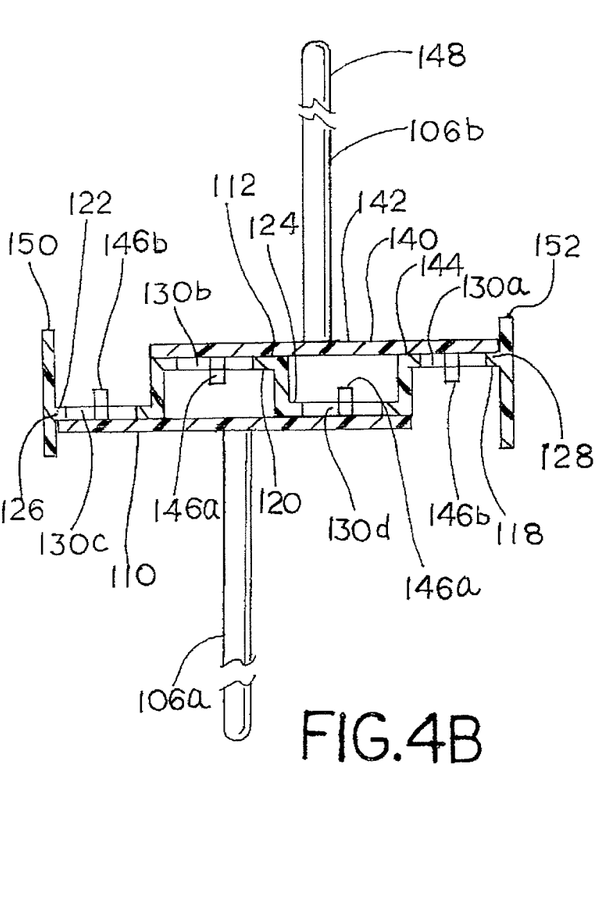
FIG. 4B is a partial horizontal cross-sectional view of the product display assembly of FIG. 4 taken along the line 4B-4B showing another version of product hangers in the form of traditional pegboard hooks releasably mounted to the hanger support member.

As also seen in FIGS. 4A and 4B, the distal ends of the flanges 150, 152 extend outwardly past the respective first and second sides 110, 112 of the web 108. In this arrangement, the flanges 150 and 152 may also act as spacers for mounting the product hangers 14*a*, 14*b* (shown in FIG. 4A) to the hanger support member 102 in a manner as previously described herein in relation to the product display system 10.

As further seen in FIGS. 4A and 4B, the channels 118-124 in the web 108 are sized and arranged such that the distal ends of the mounting brackets of a product hanger 14 or 106 mounted on one side of the web 108 will not extend beyond and/or will be recessed within the respective channels behind the outermost surface of the opposite side of the web.

As mentioned above, the hanger support member 102 in one arrangement has a constant lateral profile extending along all or a majority of the length of the web 108 between the first end 114 and the second end 116. This may be useful for ease of manufacturing, for example by extrusion. However, a flattened portion 160 (shown in FIG. 4) can also be formed in the web 108, for example, adjacent the first end 114 and include an aperture 162 suitable for receiving a hanger 76 as described previously herein. The flattened portion 160 is disposed in a central portion of the web 108 between the first and second lateral edges 126, 128. The flattened portion 160 extends laterally across a portion of each of the second channel 120 and the third channel 124 and preferably has the shape of a rectangle. A flattened portion 160 may be formed at either or both of the ends 114, 116 of the web 108 as shown in FIG. 5. However, in other arrangements the aperture 162 may be formed in any one of the channels 118 through 124 or in a side wall of any one of the channels, or the flattened portion 160 may extend across a larger portion of the web 108, such as extending completely from the first lateral edge 126 to the second lateral edge 128. The flattened portion 160 may be formed for example by pressing the web 108 after extrusion, or the hanger support member 102 may be formed by molding rather than extrusion. Other methods of forming the hanger support member 102 may also be possible and used as desired.

The apertures 130 may have any shape or outline as necessary or desired to cooperate with any one or more given brackets and/or bracket designs on a given product hanger. In FIGS. 4-5, the receiving apertures 130, as an example, have a circular shape adapted for receiving a circular head on the distal ends of the brackets of the product hangers 14 and 106. In other arrangements, as shown in the top row 132 of FIG. 4, each receiving aperture 130 may have a keyhole shape, including an upper portion having circular shape, elongate circular shape, or an oval shape, and an elongate slot (shown in dashed lines) extending downwardly from the upper portion. Other shapes and arrangements of various types of receiving apertures 130 may also be used according to the teachings of the present disclosure, such as those discussed above in reference to FIGS. 1 and 2, for example.

The product support member 102 may be formed of any material sufficient to support one or more product hangers and products as described herein, in some arrangements, the hanger support member 102 is formed of plastic, metal, wood, cardboard, paper, or other similar materials.

As shown in FIGS. 4-4B, the product support member 102 advantageously in many arrangements can be used to support different configurations of product hangers, such as the product hangers 106 and the product hangers 14, at the same time.

The product support member 102 may include more than four channels. In some arrangements, the product support member 102 may be in the form of large sheet, such as for hanging on a wall or in a product rack. In this arrangement, the product support member 102 may have, for example, any number more than four of vertically aligned channels alternating on the front and rear sides of the sheet, such as the channels 118-124, across up to the entire width of the sheet.

The product display systems 10 and 100 disclosed herein may be useful for displaying products, such as merchandise, in a retail location, such as a store. In some exemplary aspects, the product display systems 10 and 100 can be manufactured simply and cost-effectively by injection molding and/or extruding the parts from plastic and/or forming the parts from metal. The product display system is easy to assemble, and when broken down, may be very compactly stored and efficiently packed and transported.

Numerous modifications to the product display system and components thereof disclosed herein will be apparent to those skilled in the art in view of the foregoing description. Accordingly, this description is to be construed as illustrative only and is presented for the purpose of enabling those skilled in the art to make and use the product display system and to teach the best mode of carrying out same. The exclusive rights to all modifications which come within the scope of the appended claims are reserved.

I claim:

1. A hanger support member for supporting at least two product hangers to be mounted thereon, the hanger support member comprising:

a vertical web having opposite first and second sides and an axis extending from a top end to a bottom end;
   a first channel and a second channel on the first side extending along the axis;
   a third channel and a fourth channel on the second side extending along the axis;
   wherein the web has a corrugated lateral profile defining the first through fourth channels, and the first and second channels are alternatingly interspersed with the third and fourth channels;
   a first row of receiving apertures extending laterally across the first, second, third, and fourth channels, each aperture extending through the web from the first side to the second side;
   a first flange disposed along a first lateral edge of the web and a second flange disposed along a second lateral edge of the web, wherein each of the first and second flanges has a first distal end and a second distal end, the first and second distal ends of each flange extending in opposite directions from the respective lateral edge,
   wherein each of the first, second, third, and fourth channels has an open top end and an open bottom end,
   a flattened portion at the top end of the web, the flattened portion extending laterally above a portion of each of the second channel and the third channel; and
   an aperture extending through the flattened portion from the first side to the second side.

2. The hanger support member of claim 1, wherein the first row of receiving apertures comprises a first receiving aperture disposed in the first channel, a second receiving aperture disposed in the second channel, a third receiving aperture disposed in the third channel, and a fourth receiving aperture disposed in the fourth channel.

3. The hanger support member of claim 1, and a second row of receiving apertures extending laterally across the first through fourth channels, each aperture of the second row extending through the web from the first side to the second side, wherein the second row is spaced axially from the first row.

4. The hanger support member of claim 1, wherein the distal ends of each of the first and second flanges extend past the respective first or second side of the elongate body.

5. The hanger support member of claim 1, wherein each receiving aperture has a circular shape.

6. The hanger support member of claim 1, wherein each receiving aperture has a keyhole shape including a circular portion and a slot extending from the circular portion.

7. The hanger support member of claim 1, wherein the first channel is adjacent the second lateral edge of the web, the third channel is disposed adjacent the first lateral edge, the second channel is disposed between the third channel and the fourth channel, and the fourth channel is disposed between the first channel and the second channel.

8. A product display system comprising:

a hanger support member having a vertical web defining opposite first and second sides and a corrugated lateral cross-section defining a first channel and a second channel on the first side and a third channel and a fourth channel on the second side, each of the first, second, third, and fourth channels extending along a longitudinal axis of the web extending from a top end of the web to a bottom end of the web;
   a plurality of receiving apertures extending through the first and second sides of the web, the receiving apertures forming at least one row of apertures extending laterally across the first through fourth channels, the row including a receiving aperture disposed in each of the first, second, third, and fourth channels; and a first flange disposed along a first lateral edge of the web and a second flange disposed along a second lateral edge of the web, wherein each of the first and second flanges has a first distal end and a second distal end, the first and second distal ends of each flange extending on opposite sides of the respective lateral edge;

a first product hanger and a second product hanger, each product hanger comprising a bracket that fits through at least one of the receiving apertures;

wherein the first and second product hangers are simultaneously mountable to the opposite first and second sides of the hanger support member aligned with each other horizontally and vertically with the brackets extending through corresponding receiving apertures in a single row of apertures and with the channels receiving a distal end of the bracket from the product hanger mounted on the opposite side of the hanger support member.

9. The product display system of claim 8, wherein the first and second channels are alternatingly interspersed with the third and fourth channels.

10. The product display system of claim 8, wherein on each of the first and second product hangers, the bracket is arranged to be received through a first receiving aperture in a row of apertures when mounted to the first side of the hanger support member and to be received through a different, second receiving aperture in the row of apertures when mounted to the second side of the hanger support member.

11. The product display system of claim 10, wherein each of the first and second product hangers comprises a body having an outboard side opposite an inboard side, first and second brackets extending from the inboard side, and a product support member disposed on the outboard side, wherein the first and second brackets are arranged to be mounted in a first two of the receiving apertures in the row of apertures when mounted to the first side of the web, and the first and second brackets are arranged to be mounted in a second two of the receiving apertures in the row of apertures when mounted to the second side of the web.

12. The product display system of claim 8, further comprising a plurality of said rows of the apertures, each row spaced axially from adjacent rows.

13. The product display system of claim 8, wherein each product hanger fits between the first and second flanges when mounted on the first side with the first bracket of the product hanger disposed through the third receiving aperture and the second bracket of the product hanger disposed through the fourth receiving aperture.

14. The product display system of claim 8, wherein each product hanger extends laterally across the web and rests against distal ends of the first and second flanges when mounted on the first side with the first bracket of the product hanger disposed through the third receiving aperture and the second bracket of the product hanger disposed through the fourth receiving aperture.

15. The product display system of claim 14, wherein the distal ends of the first and second flanges extend beyond the first side of the web and maintain a gap between the inboard side of the body and the first side of the web.

16. A product display system, comprising:

a hanger support member having a vertical web defining opposite first and second sides and a corrugated lateral cross-section defining a first channel and a second channel on the first side and a third channel and a fourth channel on the second side, each of the first, second, third, and fourth channels extending along a longitudinal axis of the web extending from a top end of the web to a bottom end of the web, wherein the first and second channels are alternatingly interspersed with the third and fourth channels;

a plurality of receiving apertures extending through the first and second sides of the web, the receiving apertures forming a row of apertures extending laterally across the first through fourth channels, the row including a first receiving aperture disposed in the first channel, a second receiving aperture disposed in the second channel, a third receiving aperture disposed in the third channel, and a fourth receiving aperture disposed in the fourth channel;

a first product hanger having a first body and first and second mounting brackets on an inboard side of the first body, wherein the first product hanger is removably mounted on the first side of the web with the first mounting bracket disposed through the fourth receiving aperture and the second mounting bracket disposed through the third receiving aperture; and a second product hanger having a second body and third and fourth mounting brackets on an inboard side of the second body, wherein the second product hanger is removably mounted on the second side of the web with the third mounting bracket disposed through the second receiving aperture and the fourth mounting bracket disposed through the first receiving aperture.

17. The product display system of claim 16, wherein the hanger support member further comprises:

a first flange disposed along a first lateral edge of the web and a second flange disposed along a second lateral edge of the web, wherein each of the first and second flanges has a first distal end and a second distal end, the first and second distal ends of each flange extending on opposite sides of the respective lateral edge.

* * * * *